(12) United States Patent
Lance et al.

(10) Patent No.: US 8,612,657 B2
(45) Date of Patent: Dec. 17, 2013

(54) SYSTEM AND METHOD FOR COMMUNICATING ON AN ELECTRICAL BUS

(75) Inventors: Philippe Lance, Toulouse (FR); Valerie Bernon-Enjalbert, Fonsorbes (FR); Thierry Cassagnes, Tournefeuille (FR)

(73) Assignee: Freescale Semiconductor, Inc., Austin, TX (US)

( * ) Notice: Subject to any disclaimer, the term of this patent is extended or adjusted under 35 U.S.C. 154(b) by 333 days.

(21) Appl. No.: 13/059,084

(22) PCT Filed: Aug. 22, 2008

(86) PCT No.: PCT/IB2008/054480

§ 371 (c)(1),
(2), (4) Date: Feb. 15, 2011

(87) PCT Pub. No.: WO2010/020838

PCT Pub. Date: Feb. 25, 2010

(65) Prior Publication Data

US 2011/0138090 A1    Jun. 9, 2011

(51) Int. Cl.
*G06F 13/00* (2006.01)
*G06F 13/364* (2006.01)
(52) U.S. Cl.
CPC .................... *G06F 13/364* (2013.01)
USPC ........................................ 710/110

(58) Field of Classification Search
USPC ................ 710/104–119, 8–19, 1–2
See application file for complete search history.

(56) References Cited

U.S. PATENT DOCUMENTS

| 6,188,314 B1 | 2/2001 | Wallace et al. |
|---|---|---|
| 7,093,052 B2 | 8/2006 | Cho et al. |
| 7,248,696 B2 | 7/2007 | Craft et al. |
| 2008/0049606 A1 | 2/2008 | Rhelimi et al. |

OTHER PUBLICATIONS

TRW Automotive, Freescale Semiconductor: "DSI Bus Standard Version 2.02" [Online] Mar. 29, 2005, XP002528974, Retrieved from the internet: URL:http://www.freescale.com/files/analog/doc/support_info/dsibusstandard.pdf> [retrieved on May 20, 2009] pp. 5-7.
International Search Report and Written Opinion correlating to PCT/IB2008/054480 dated Jun. 3, 2009.

*Primary Examiner* — Raymond Phan

(57) ABSTRACT

Method and apparatus for communicating on an electrical bus by generating a master logical signal on the electrical bus in the form of a pulse-width modulation signal. Generating a slave logical signal on the electrical bus in the form of a current signal. Reading the slave logical signal by sampling the magnitude of the current signal on the electrical bus, wherein magnitude of the current on the electrical bus is sampled at a point in the bit time when the voltage on the electrical bus has remained constant for a period longer than the shortest time that the voltage remains at any level during the bit time.

20 Claims, 5 Drawing Sheets

Fig. 5
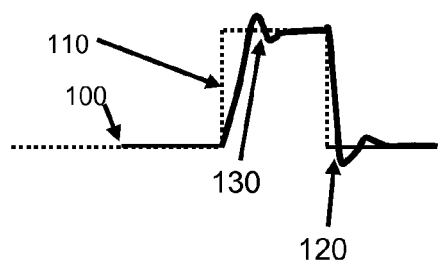
Fig. 6
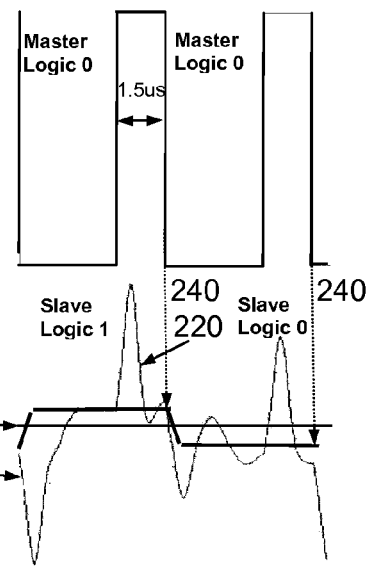
Fig. 7

US 8,612,657 B2

SYSTEM AND METHOD FOR COMMUNICATING ON AN ELECTRICAL BUS

FIELD OF THE INVENTION

This invention relates to a method and apparatus for communicating on an electrical bus and in particular a two-wire electrical bus.

BACKGROUND OF THE INVENTION

An electrical or communications bus (or simply bus) is a physical electrical interface where more than one device shares the same electric connection. Two-wire electrical buses are particularly suitable for use in vehicle systems as they are more robust and simple to install and configure. Various communication protocols may be used on such electrical buses and used to provide communications between electronic components located throughout a vehicle. In particular, airbag systems have many types of components that may be connected to a network. Airbag systems require robust and failsafe communications between the various components to avoid critical system failures or incorrect airbag deployment.

"DSI bus standard version 2.02", 29 Mar. 2005, TRW Automotive and Freescale Semiconductor describes the Distributed System Interface (DSI) message protocol. The DSI is a single master device multiple slave device data communications (electrical) bus implemented on two wires. The bus utilises voltage modulation (pulse-width modulation) signalling for digital messages sent from the single master device (master) to the slave devices (slaves) and current mode signalling from the slave devices to the master device. Slave devices only transmit in response to messages sent from the master device and are synchronised to the master signals.

A bit time is the duration of one bit or the reciprocal of the transmission frequency. For example, a 1 kHz (1 kbps) signal has a bit time of 1 ms. In the DSI message protocol the master voltage modulation is formed by separating each bit time into thirds. For a master logical zero the master produces a signal that is low for ⅔ of the bit time and high for the final ⅓ (a top hat voltage pulse). For a master logical one the master device produces a voltage signal that is low for ⅓ of the bit time and high for the remaining ⅔ of the bit time, i.e. the last ⅔ portion of the bit time.

FIG. 2 shows a schematic diagram illustrating logical one and logical zero master logic signals according to the DSI message protocol.

According to the DSI message protocol slave responses to commands are sent using a modulated current signal, which is self synchronised to a falling edge voltage from the master voltage signal. Master and slave devices transmit simultaneously, i.e. the DSI is a duplex system of communication. During the response time the master device sends a pulse train of any combination of ones or zeros. The current mode bits are sent during the bit time and sampled by the master device at the falling edge of the voltage pulse generated by the master device. When the slave device produces a logical one, the slave device draws additional current above a particular threshold from the electrical bus during the bit time. If a logical zero is transmitted the slave device does not draw additional current during the bit time. The master device detects the current drawn from the electrical bus at a predetermined point in the bit time, i.e. the sampling point, to determine the bit type transmitted by the slave device.

FIG. 3 shows a schematic diagram of the slave logical one and slave logical zero current signals, respectively. The dotted lines in FIGS. 3 and 4 indicate the sampling point, which in the DSI message protocol is on the falling voltage edge of the master signal, i.e. at the end of the bit time. FIG. 4 shows the decoded slave logical signal for any point in the bit time, i.e. how the master receiver would decode the current at any particular point in time.

SUMMARY OF THE INVENTION

The present invention provides a communications method, a communication system, a vehicle and a communication device as described in the accompanying claims.

Specific embodiments of the invention are set forth in the dependent claims.

These and other aspects of the invention will be apparent from and elucidated with reference to the embodiments described hereinafter.

BRIEF DESCRIPTION OF THE DRAWINGS

Further details, aspects and embodiments of the invention will be described, by way of example only, with reference to the drawings. Elements in the figures are illustrated for simplicity and clarity and have not necessarily been drawn to scale.

FIG. 5 shows an example voltage trace present on the electrical bus shown in FIG. 1;

FIG. 6 shows an example master voltage modulation signal generated by the master device of FIG. 1;

FIG. 7 shows a current signal on the electrical bus of FIG. 1;

It should be noted that the figures are illustrated for simplicity and are not necessarily drawn to scale.

DETAILED DESCRIPTION OF THE PREFERRED EMBODIMENTS

Figure 1:
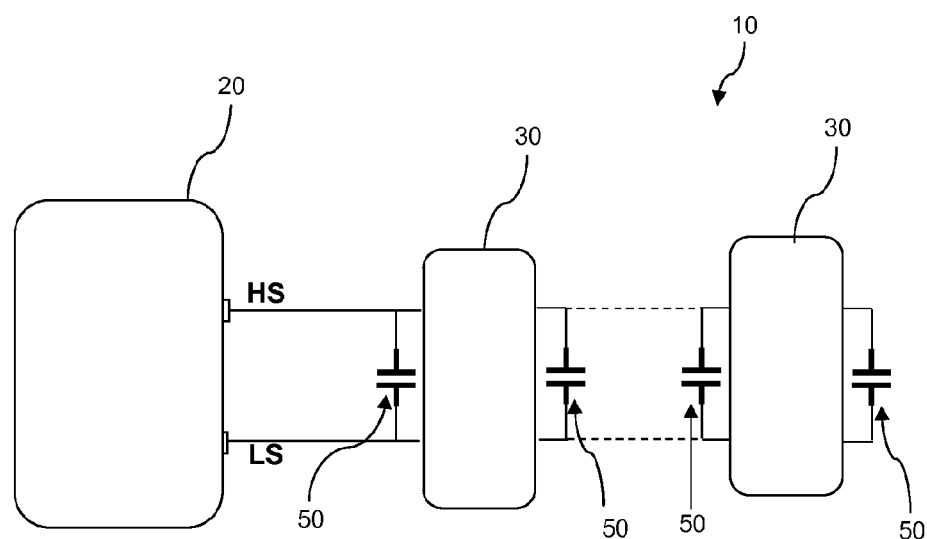
FIG. 1 schematically shows a network having master and slave devices joined by a two-wire electrical bus.
Figures 2, 3, 4:
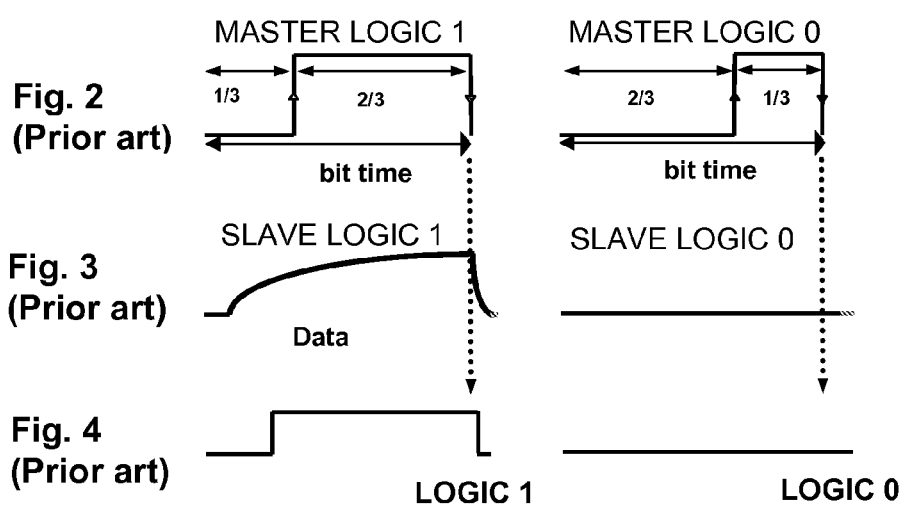
FIG. 2 shows a schematic diagram of voltage modulation used by the master device of FIG. 1, according to the prior art.
FIG. 3 shows a schematic diagram of the current modulation used by the slave devices of FIG. 1, according to the prior art.
FIG. 4 shows a receiver decoding interpretation of the current modulation of FIG. 3, according to the prior art.

FIG. 1 shows a schematic diagram of a master device 20 and two slave devices 30 forming a network system 10 linked by a two wires HS, LS forming the electrical bus. Slave capacitors 50 are placed across the two wires HS, LS to prevent electrical interference between the network 10 and other vehicle systems. Furthermore, the two wires HS, LS may also contributes to a capacitance on the electrical bus. The slave capacitors 50 may each have a capacitance of several nF. The exact capacitance may be chosen depending on the environment and electrical characteristics of the electrical bus and slave devices 30. Therefore, when a master voltage pulse is generated the slave capacitors 50 are each charged by the master voltage pulse leading to a current in the two wires HS, LS. This charging current is independent from the slave current signal and is present whether or not a slave device 30 is deliberately drawing current to produce a logical one current signal. Furthermore, when the master voltage signal falls back to zero the slave capacitors 50 will then discharge onto the electrical bus again causing a current to flow on the electrical bus.

Moreover, the capacitive loading on the electrical bus leads to a certain amount of voltage overshoot and undershoot when the master voltage signal is applied. This results in a voltage ripple, following both the rising and falling edges of the voltage pulse, before a steady voltage is reached. The time to reach this steady state may be known as the slew recovery time. Furthermore, these ripples or voltage oscillations generate currents in the slave capacitors 50 and on the electrical bus that may interfere with the slave response.

To avoid the master device 20 interpreting the current oscillations as a slave current logical one signal or obscuring a logical zero slave signal the master device 20 may only sample the current on the electrical bus after a steady state has been reached or at least at a point in the bit time where any remaining oscillations have a magnitude low enough that they do not interfere or overwhelm the slave current signal. In this example each slave device 30 has its own slave capacitors 50. Therefore, as the number of slave devices 30 in the network is increased so does the slew recovery time. As the slew recovery time increases so does the required bit time (in order to avoid sampling during the slew recovery time). This in turn reduces the maximum data rate available from the network 10.

FIG. 5 illustrates the voltage master voltage signal for a logical zero 110 bit applied to the electrical bus and the actual voltage 100 on the electrical bus due to the capacitive load. In other words signal 110 is the internal digital signal driving a buffer, and 100 is the actual differential voltage applied on the electrical bus. FIG. 5 shows the overshoot, and recovery at arrows 120 and 130. A positive dV/dt will charge the slave capacitors 50, and a negative dV/dt will discharge the slave capacitors 50. During such a master logic zero the voltage across the two wires HS, LS is high for the last ⅓ of the bit time. According to the DSI message protocol the master device samples the current at the falling edge of the master voltage pulse. At this time, the slave capacitors 50 have had sufficient time to charge and so are no longer charging but there will still be a current in the electrical bus associated with the voltage ripples 120. If the bit rate increases to a level that is too high then the master device 30 may sample the current on the bus while the voltage is still oscillating (i.e. steady state takes more than ⅓ of the shortened bit time to be reached) resulting in an unwanted current on the electrical bus even at the end of the master voltage pulse.

If this occurs the master device 20 may record a slave logic one even when the slave device 30 is not deliberately drawing any current, i.e. in a slave logical zero state. At such a data rate a master receiver within the master device 20 cannot decode the correct current signal from the slave and errors in data transmission may occur.

This problem is further illustrated by FIGS. 6 and 7. FIG. 6 shows the master voltage signal where two master logic zeros are transmitted back to back.

FIG. 7 shows the resultant current on the electrical bus for a slave logic one and then a slave logic zero. Lines 210 and 220 indicate the total current on the electrical bus at different points in time where there is a significant current due to both the capacitance slewing and the slave device logical signals. The threshold for a slave logical one is shown as line 230 (i.e. above the threshold the current signal will be decoded as a slave logical one). The sampling points are indicated by the dotted arrows 240. At the sampling points the charging or slewing current does not interfere with the logical signal current of the slave device 30 and therefore decoding error will not be encountered at this data transmission rate.

Within an airbag system it is desirable to have faster transmission rates, whilst retaining reliability, as this allows detectors associated with the slave devices 30 to be interrogated more often providing a faster response (for example to deploy airbags more quickly when required).

As described above, the data transmission rate may be limited by the slew recovery rate. In other words, the master device 20 may only sample the current on the electrical bus formed from two wires HS, LS after all slave capacitors 50 have been fully charged and are no longer contributing to the current or at least no longer contributing to such a current that would breach the predetermined sampling threshold 230 or when the steady state voltage has been reached following a period of oscillating voltage. As the master logical zero signal has a voltage pulse duration of half that of the logical one signal and occurs during the last third of the bit time, it is the logical zero master signal that provides a limit to the data transmission rate. This is because the logical zero (or ⅓ bit time voltage pulse) voltage signal allows slewing to stop within only half the time compared with the logical one master signal (⅔ of the bit time), see FIG. 5, for instance.

Therefore, the total capacitance across the electrical bus is one determining factor in the minimum duration of a bit time and also the maximum data transmit rate. This problem may be overcome by changing the sampling point in the bit time. This may be done during either or both of the master logical signal types. For instance, this may be done during the master signal logic transmission signal having a voltage pulse shorter than half the bit time (zero logic) or for both the shorter and longer (one logic) master logic transmission signals or for the longer master logic signal only.

Figure 8:
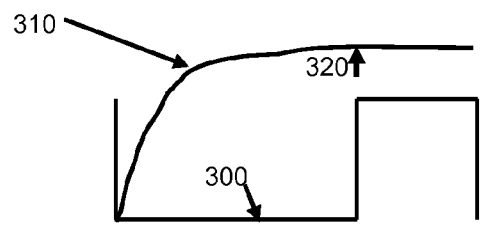
FIG. 8 shows a schematic diagram of a master voltage signal generating a zero logic signal and a corresponding slave current signal according to an embodiment of the present invention.

For example, FIG. 8 shows a bit time having a master logical zero voltage signal 300 and a slave current logic signal one synchronised together. Arrow 320 indicates the time at which the master device 20 samples the current on the electrical bus. This sampling point for the master logical zero signal bit time is on the rising edge of the voltage pulse 300 (master voltage modulation). At this particular point in the bit time, the slave capacitors 50 have not yet begun to charge and so do not contribute to slewing of the voltage on the electrical bus. Furthermore, at this point in the bit time any discharge of the slave capacitors 50 or any other capacitance in the communication system 10 will have had ⅔ of the bit time to fully discharge and reach a steady state and so reduce any slewing currents on the electrical bus.

Figure 9:
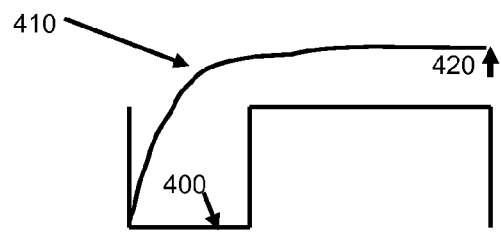
FIG. 9 shows a schematic diagram of an example master voltage signal indicating a logic one state and a corresponding slave current signal according to an embodiment of the present invention.

FIG. 9 shows a single bit time plot for a logical one master voltage signal 400 and a logical one slave current signal 410. During a master voltage logical one signal a master device 20 samples the current on the electrical bus on the falling edge of the voltage pulse shown by arrow 420. At this sampling time the slave capacitors 50 will have had ⅔ of the bit time to fully charge and for slewing to end and therefore will also reduce the contribution to the current on the electrical bus.

In other words, for one type of master logical signal the current sampling occurs at a different point in the bit time than for another type of master logical signal. For example, current sampling may occur before or on a rising voltage edge for a short (which may or may not be less than half the bit time) voltage pulse and on or after a falling voltage edge for a longer voltage pulse (i.e. longer than the short pulse but not necessarily longer than half the bit time although it may be). A rising voltage edge may be an increase in voltage magnitude on the electrical bus and a falling voltage edge may be a decrease in voltage magnitude on the electrical bus.

Therefore, the minimum bit time (at least due to capacitive voltage oscillations) may be achieved when the slave capacitors 50 have stopped contributing to voltage oscillations within ⅔ of the bit time rather than ⅓ of the bit time for the DSI message protocol. This may allow for up to a doubling in the bit rate before capacitive slewing interferes with the sampled current signal.

Figure 10:
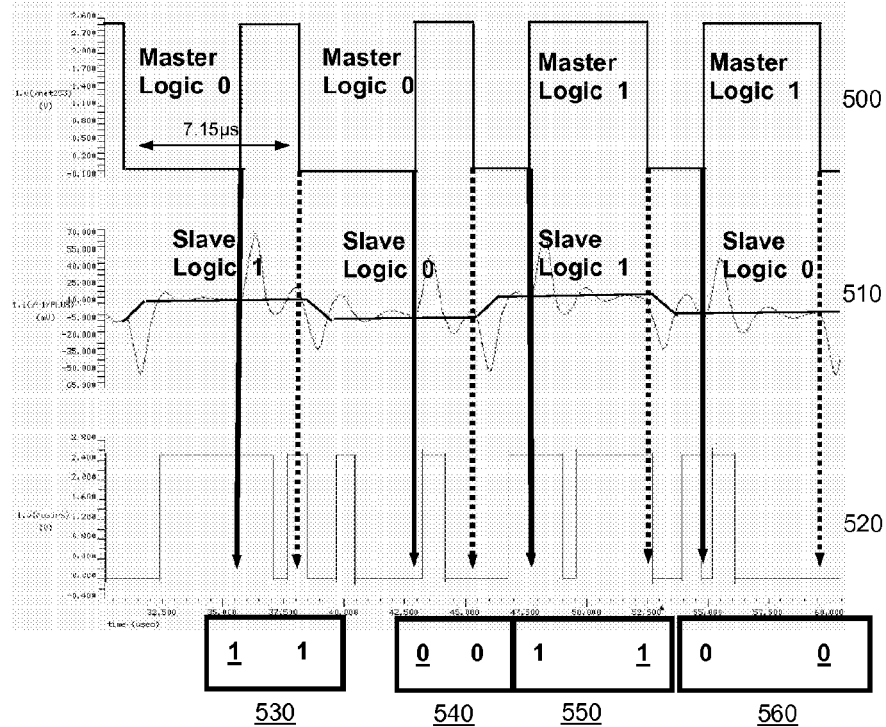
FIG. 10 shows a schematic diagram of a series of logic signals generated according to an example embodiment of the present invention.

FIG. 10 shows a combined graphical representation of a synchronised train of master and logical signals operating at a frequency where the DSI message protocol (sampling for both master signal types occurs at the voltage falling edge) may successfully operate. The upper trace 500 of FIG. 10 shows schematically an example series of master logical signals in the form of "0011". The middle trace 510 shows an example series of slave logical signals in the form of "1010". The bottom trace 520 shows the current receiver decoding that would occur at all points in the bit time, i.e. how the slave logical signal would be decoded by the master at any particular point in time.

The solid arrows in trace 520 indicate the sampling points at the rising edge of the master logical voltage signal. The dotted arrows indicate the sampling points at the falling edge of the master logical voltage signal. Boxes 530, 540, 550 and 560 show the results of sampling at the rising or falling edge of the voltage pulse. Each box corresponds with a single bit time. The sampling results for rising edges on master voltage logical zeros and falling edges on master voltage logical ones are underlined. For each bit time at this particular example transmission frequency the sample results are the same for both sampling points. In other words, for this particular example frequency (140 kbps) there is no difference in sampling at the rising or falling edge of the voltage pulse for both logical zero (short voltage pulse) and logical one signals (long pulse).

Figure 11:
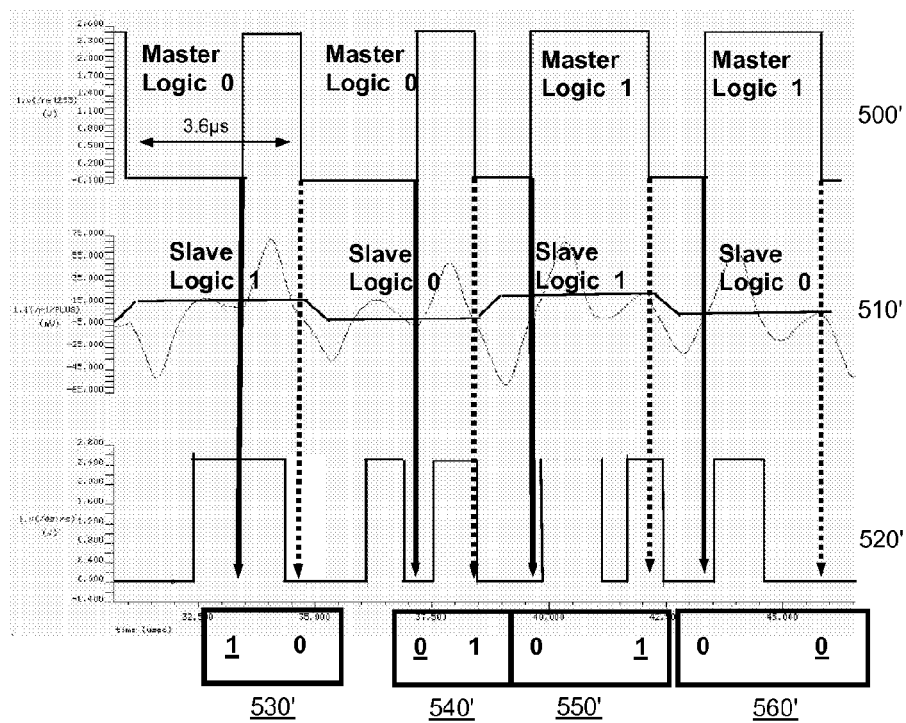
FIG. 11 shows a schematic diagram of a series of logic signals according to an example embodiment of the present invention.

FIG. 11 shows a combined graphical representation of a synchronised train of master and logical signals operating at a frequency around twice that shown in FIG. 10. Traces 500', 510' and 520' correspond with traces 500, 510 and 520 of FIG. 10, respectively and the same logical sequences are shown. However, the data rate shown for FIG. 11 is around 280 kbps (i.e. the bit time is half that of FIG. 10). At this rate the slew recovery time has a significant effect on the current in the electrical bus at the sampling time. Sampling at the falling edge of the voltage signal (dotted arrows) for both zero and one voltage modulation leads to errors as the master voltage steady-state has not always occurred by this sampling point in the bit time. For instance, sample result 530' shows a correctly decoded one for the rising edge sample but an incorrect zero for the falling edge sample (DSI message protocol) due to the capacitive induced current oscillations cancelling out the slave current signal. Sample result 540' shows a correct zero for the rising edge sample but an incorrect one for the falling edge sample (DSI message protocol) as the master logical zero (short duration voltage peak) for similar reasons. In other words, the DSI message protocol (sampling on falling voltage edges for both logical one and zero signals) would produce sampling errors at this example data rate and capacitive loading. However, by sampling on the rising edge for one of the logical signal types (in this example the master zero logical signal) and sampling on the falling edge for the other logical signal type these types of decoding errors may be avoided.

The example embodiments described above use positive voltage values. Obviously, for negative voltage pulses the same is also true and the voltage and associated current oscillations may still occur. Alternative embodiments may have a grounded wire as one of the two wires HS, LS in the electrical bus or a differential voltage between the two wires HS, LS; polarity may be reversed.

Alternatively, the voltage pulse (⅓ of the bit time for a zero master voltage signal or ⅔ of the bit time for a logic one master voltage signal) may be located at the start of the bit time rather than at the end. The master device synchronises the slave signals, although other synchronisation techniques may be used or none at all. In one example embodiment the slave signals may be synchronised to the falling edge of the master voltage logic signal as in the DSI message protocol.

In the foregoing specification, the invention has been described with reference to specific examples of embodiments of the invention. It will, however, be evident that various modifications and changes may be made therein without departing from the broader spirit and scope of the invention as set forth in the appended claims. For example, the connections may be a type of connection suitable to transfer signals from or to the respective nodes, units or devices, for example via intermediate devices. Accordingly, unless implied or stated otherwise the connections may for example be direct connections or indirect connections.

For example, different types of voltage modulation may be used for the master logical signals and the logical type (one or zero) may be reversed.

In general terms the sample point may be chosen depending on the voltage modulation used so that the effect of capacitive slewing on the sampled current is reduced.

The pulse-width modulation may indicate a particular logical state by providing a voltage pulse longer or shorter than one half of the bit time; for example, ⅓, ⅔, ¼, ¾ or any further combinations. The current may be sampled at or near to the falling (in voltage magnitude) edge of the voltage pulse when the pulse is shorter than one half of the bit time and/or on the rising edge for voltage pulses longer than one half of the bit time. In one alternative the voltage modulation may have different duration voltage pulses. The current sampler or receiver may be a part of the master device 20 or be a separate device located somewhere else on the electrical bus. Current sampling may occur on the edge of the voltage pulse that left the longest (or at least longer) settling time for the buffer capacitors 50.

In the above examples the current sampling is shown to occur at the same time as a rising or falling edge (voltage magnitude change). However, this does not need to be exactly as the same time as these edges as long as sampling occurs at least when a steady-state has been reached. A certain tolerance or time difference may be used to determine this. An acceptable tolerance may be found for each particular configuration (capacitance, number of slave devices, bus length, etc.) by considering the time taken to cross the current signal threshold, e.g. how long after the rising edge the voltage pulse takes to generate a current oscillation magnitude that may be interpreted as a slave logical one or similarly how long after the falling voltage edge a steady state may be reached. Sampling may be before the rising voltage magnitude of the master voltage pulse as long as the voltage oscillators have died down to a sufficient level to avoid interference with the slave current signal by the current sampling time.

In other words, an improvement in data rate may be shown where the current sample is made at a point in the bit time when the voltage on the electrical bus has remained constant for a period longer than the shortest time that the voltage remains at any level (e.g. high or low or indeed any other level) for any or either type of master logical signal type generated during the particular bit time that the current sampling is made. For the DSI protocol the current sample is taken at the falling edge of the zero master voltage signal, which is when the voltage on the bus has remained constant for a period equal to the shortest time that the voltage remains at a particular level (high in this example). An improvement in data rate may be achieved when the voltage has remained constant for periods up to 1, 5, 10, 33 or 50% longer (or anything in between) than the shortest voltage pulse used in the voltage modulation scheme, for instance.

Reading the slave logical signal by sampling the magnitude of the current signal on the electrical bus, wherein the magnitude of the current on the electrical bus is sampled substantially at the same time as the increase in voltage magnitude when the master device is generating a first type of master logical signal during the bit time provides an even greater improvement in data rate. This is the point in the bit time that the voltage on the bus has remained constant for the longest time, at least for a master logical signal with a voltage pulse duration less than half the bit time.

For instance, in alternative embodiments current sampling may be made at points in the bit time other than on the rising or falling edges of the master voltage pulse. However, these edges are convenient synchronisation points.

The invention may also be implemented in a computer program for running on a computer system, at least including code portions for performing steps of a method according to the invention when run on a programmable apparatus, such as a computer system or enabling a programmable apparatus to perform functions of a device or system according to the invention. The computer program may for instance include one or more of: a subroutine, a function, a procedure, an object method, an object implementation, an executable application, an applet, a servlet, a source code, an object code, a shared library/dynamic load library and/or other sequence of instructions designed for execution on a computer system. The computer program may be provided on a data carrier, such as a CD-rom or diskette, stored with data loadable in a memory of a computer system, the data representing the computer program. The data carrier may further be a data connection, such as a telephone cable or a wireless connection.

As used herein, the term "bus" is used to refer to a plurality of signals or conductors which may be used to transfer ones and zeros between devices. The terms "assert" or "set" and "negate" (or "deassert" or "clear") are used herein when referring to the rendering of a signal, status bit, or similar apparatus into its logically true or logically false state, respectively. If the logically true state is a logic level one, the logically false state is a logic level zero. And if the logically true state is a logic level zero, the logically false state is a logic level one.

Each signal described herein may be designed as positive or negative logic. In the case of a negative logic signal, the signal is active low where the logically true state corresponds to a logic level zero. In the case of a positive logic signal, the signal is active high where the logically true state corresponds to a logic level one. Note that any of the signals described herein can be designed as either negative or positive logic signals. Therefore, in alternate embodiments, those signals described as positive logic signals may be implemented as negative logic signals, and those signals described as negative logic signals may be implemented as positive logic signals.

The conductors as discussed herein may be illustrated or described in reference to being a single conductor, a plurality of conductors, unidirectional conductors, or bidirectional conductors. However, different embodiments may vary the implementation of the conductors. For example, separate unidirectional conductors may be used rather than bidirectional conductors and vice versa. Also, plurality of conductors may be replaced with a single conductor that transfers multiple signals serially or in a time multiplexed manner. Likewise, single conductors carrying multiple signals may be separated out into various different conductors carrying subsets of these signals. Therefore, many options exist for transferring signals.

Because the apparatus implementing the present invention is, for the most part, composed of electronic components and circuits known to those skilled in the art, circuit details will not be explained in any greater extent than that considered necessary as illustrated above, for the understanding and appreciation of the underlying concepts of the present invention and in order not to obfuscate or distract from the teachings of the present invention.

Thus, it is to be understood that the architectures depicted herein are merely exemplary, and that in fact many other architectures can be implemented which achieve the same functionality. In an abstract, but still definite sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality.

Although the invention has been described with respect to specific conductivity types or polarity of potentials, skilled artisans appreciated that conductivity types and polarities of potentials may be reversed.

Also, devices functionally forming separate devices may be integrated in a single physical device. However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

The invention claimed is:

1. A method for communicating on an electrical bus between a master device and a slave device, the method comprising:
   generating a master logical signal on the electrical bus during a bit time, wherein
      said generating the master logical signal is performed by the master device,
      the master logical signal comprises a voltage pulse defined by an increase in voltage magnitude and a decrease in voltage magnitude on the electrical bus, and
      the time that the voltage on the electrical bus is at a level within the bit time is dependent on the logical value of the master logical signal;
   generating a slave logical signal on the electrical bus during the same bit time, wherein
      said generating the slave logical signal is performed by the slave device
      the slave logical signal comprises a current signal, and the magnitude of the current signal is dependent on the logical value of the slave logical signal; and
   reading the slave logical signal by sampling the magnitude of the current signal on the electrical bus substantially at the same time as the increase in voltage magnitude when a logic generator is generating a first type of logical signal and at substantially the same time as the decrease in voltage magnitude when the logic generator is generating a second different type of logical signal.

2. The method of claim 1, wherein the electrical bus comprises two conductors.

3. The method of claim 2, wherein one of the two conductors is grounded.

4. The method of claim 2 further comprising:
   applying the voltage pulse on the electrical bus in the form of a voltage differential between the two conductors.

5. The method of claim 4, wherein the voltage pulse has a positive or a negative voltage.

6. The method of claim 5, wherein a capacitance is in parallel with the electrical bus.

7. The method of claim 6, wherein the capacitance is arranged to be charged by the voltage pulse.

8. The method of claim 7, further comprising:
   fully charging the capacitance within the duration of the voltage pulse.

9. The method of claim 8, wherein the slave device further comprises an airbag sensor.

10. The method of claim 6 further comprising:
    generating a master logical signal on the electrical bus in the form of a pulse-width modulation signal, wherein said generating is performed by the master device.

11. A communication system comprising:
    an electrical bus for communicating between one or more devices;
    a master device arranged to generate a master logical signal on the electrical bus during a bit time in the form of a voltage pulse defined by an increase in voltage magnitude and a decrease in voltage magnitude on the electrical bus, wherein the time that the voltage on the electrical bus is at a level within the bit time is dependent on the logical value of the master logical signal type;
    a slave device arranged to generate a slave logical signal on the electrical bus during the same bit time in the form of a current signal, wherein the magnitude of the current signal is dependent on the logical value of the slave logical signal; and
    a receiver arranged to read the slave logical signal by sampling the magnitude of the current signal on the electrical bus substantially at the same time as the increase in voltage magnitude when the logic generator is generating a first type of logical signal and at substantially the same time as the decrease in voltage magnitude when the logic generator is generating a second different type of logical signal.

12. A vehicle comprising the communication system of claim 11.

13. The communication system of claim 11, wherein the electrical bus comprises two conductors.

14. The communication system according to claim 11, wherein the voltage pulse has a positive or a negative voltage.

15. The communication system of claim 13, wherein one of the two conductors is grounded.

16. The communication system of claim 13 further comprising:
    the master device further arranged to apply the voltage pulse on the electrical bus in the form of a voltage differential between the two conductors.

17. The communication system according to claim 14 further comprising a capacitance parallel with the electrical bus.

18. The communication system of claim 17, wherein the capacitance is arranged to be charged by the voltage pulse.

19. The communication system of claim 18, wherein the capacitance is arranged to be fully charged within the duration of the voltage pulse.

20. A communication device arranged to communicate with other devices on an electrical bus, the communication device comprises:
    a logic generator arranged to generate a logical signal on the electrical bus in the form of a voltage pulse defined by an increase in voltage magnitude and a decrease in voltage magnitude, wherein the time that the voltage on the electrical bus is at a level within a bit time is dependent on the logical value of the logical signal; and
    a current sensor arranged to sample the magnitude of current on the electrical bus substantially at the same time as the increase in voltage magnitude when the logic generator is generating a first type of logical signal and at substantially the same time as the decrease in voltage magnitude when the logic generator is generating a second different type of logical signal.

* * * * *